United States Patent [19]

Watanabe et al.

[11] Patent Number: 5,488,590
[45] Date of Patent: Jan. 30, 1996

[54] MAGNETO-OPTICAL OVERWRITE RECORDING AND REPRODUCING SYSTEM

[75] Inventors: Tetsu Watanabe, Tokyo; Tamotsu Yamagami, Kanagawa, both of Japan

[73] Assignee: Sony Corporation, Japan

[21] Appl. No.: 301,045

[22] Filed: Sep. 6, 1994

Related U.S. Application Data

[63] Continuation of Ser. No. 825,542, Jan. 24, 1992, abandoned.

[30] Foreign Application Priority Data

Jan. 28, 1991 [JP] Japan ................................. 3-025061

[51] Int. Cl.⁶ .......................... G11B 7/00; G11B 11/00
[52] U.S. Cl. ................ 369/13; 369/44.28; 369/44.37; 369/275.2
[58] Field of Search ........................ 369/275.1–275.5, 369/13, 44.26, 44.34, 44.32, 121, 100, 44.37, 44.27, 44.28, 44.29; 360/114, 59, 13, 18

[56] References Cited

U.S. PATENT DOCUMENTS

| | | |
|---|---|---|
| 4,101,947 | 7/1978 | Lambeth .................... 360/18 |
| 4,516,165 | 5/1985 | Cunningham et al. ............... 360/13 |
| 4,516,234 | 5/1985 | Nakagawa et al. ................ 369/275.4 |
| 5,077,714 | 12/1991 | Katayama et al. ............. 360/114 |
| 5,144,602 | 9/1992 | Kudoh et al. ................... 369/13 |
| 5,191,563 | 3/1993 | Lee et al. ..................... 369/13 |
| 5,245,584 | 9/1993 | Miura et al. ................ 369/275.3 |

FOREIGN PATENT DOCUMENTS 63-166051  7/1988  Japan.

Primary Examiner—Nabil Z. Hindi
Attorney, Agent, or Firm—Limbach & Limbach

[57] ABSTRACT

A magneto-optical recording and reproducing system in a magneto-optical disk capable of being overwrite recorded by applying a magnetic field to a photo-sensitive recording layer and irradiating a laser beam onto the recording layer. A track pitch and a diameter of the laser beam are set so that recording tracks to be formed by irradiation of the laser beam overlap, each other between adjacent tracks. Accordingly, data recording density of the magneto-optical disk, especially in a radial direction thereof, can be increased.

12 Claims, 4 Drawing Sheets

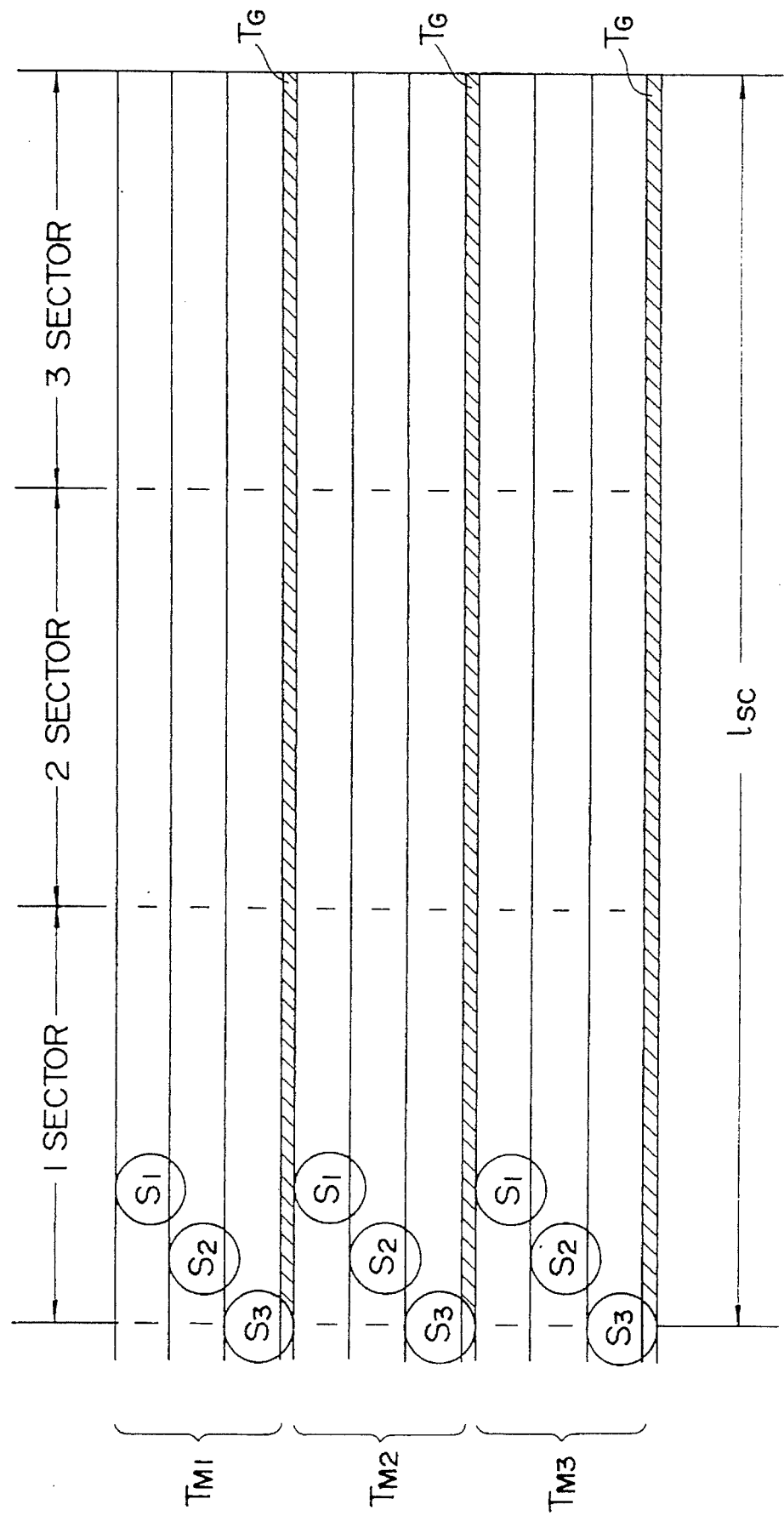

FIG. 5A
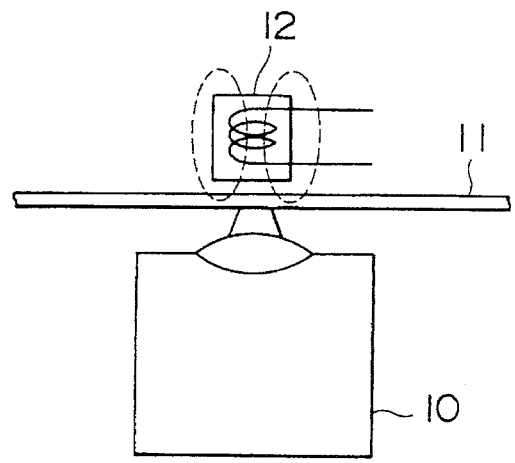
FIG. 5B
| | |
|---|---|
| EXTERNAL MAGNETIC FIELD | 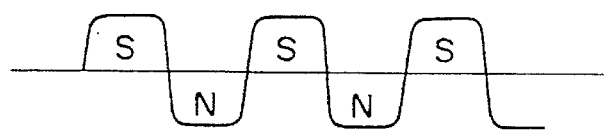 |
| LASER PULSE | 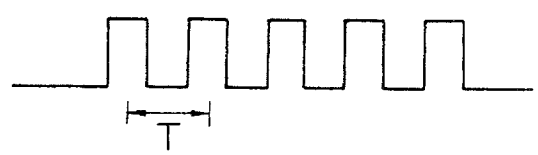 |
| SPOT SIZE |  |
| RECORDING PIT | 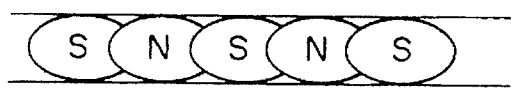 |

MAGNETO-OPTICAL OVERWRITE RECORDING AND REPRODUCING SYSTEM

This is a continuation of application Ser. No. 07/825,542 filed on Jan. 24, 1992, now abandoned.

BACKGROUND OF THE INVENTION

The present invention relates to a magneto-optical recording and reproducing system useful in increasing a recording density of data to be recorded on a magneto-optical disk.

FIG. 5A illustrates magneto-optical recording by a magnetic field modulation system. As shown in FIG. 5A, a laser pulse output from an optical head 10 is irradiated onto a recording surface of a magneto-optical disk 11, and at the same time, an external field, modulated by recording data, is applied to the magneto-optical disk 11 by a magnetic head 12. When a temperature at a part irradiated by the laser pulse reaches a Curie temperature, the recording data is left in an orientation of the applied magnetic field.

Referring to FIG. 5B, when a part of a recording layer irradiated by the laser pulse reaches a Curie temperature, this part, corresponding to a spot size of the laser beam at the Curie temperature is magnetized by the external magnetic field, recording pits are formed along a recording track on the magneto-optical disk.

To increase a recording density in such a magnetic field modulation system, a pulse spacing T for driving a laser light source is made smaller than the spot size of the laser beam to partially overlap the recording pit previously formed and the recording pit subsequently formed, thus overwriting the subsequent recording pit at such an overlapped portion in a circumferential direction of the disk.

That is, while the pits are formed one by one in a time series manner, an intended increase in recording density causes the generation of the overlapped portion between the adjacent pits as shown in FIG. 5B, and the overlapped portion has information at a magnetization change point (edge), i.e., so-called edge recording is effected.

However, a pitch of the edge recording tracks is usually set to be equal to or larger than the laser spot diameter (about 1.5 μm) which is limited by a wavelength λ of the laser beam and a numerical aperture NA of an objective lens. Therefore, a recording density of data to be recorded in a radial direction of one optical disk is limited by the wavelength λ of the laser beam.

While the data recording density in the radial direction of the optical disk becomes larger in inverse proportion to the pitch P of the recording tracks and the wavelength λ of the laser beam, a reduction in the wavelength λ and the track pitch P is considered to rely upon development of a new device, which has been difficult to realize.

SUMMARY OF THE INVENTION

It is accordingly an object of the present invention to provide a magneto-optical recording and reproducing system which can easily increase a data recording density of a magneto-optical disk especially in a radial direction thereof.

According to the present invention, there is provided in a magneto-optical disk capable of being overwrite recorded by applying a magnetic field to a photo-sensitive recording layer and irradiating a laser beam onto said recording layer; a magneto-optical recording and reproducing system characterized in that a track pitch and a diameter of said laser beam are set so that recording tracks to be formed by irradiation of said laser beam are overlapped each other between adjacent tracks.

Data is recorded on the magneto-optical disk with a track pitch smaller than a spot diameter of a laser beam to be irradiated, so that recording tracks formed by the irradiation of the laser beam adjacent to each other are overlapped. That is, the data previously recorded on such an overlapped portion is overwritten by the data subsequently recorded on the overlapped portion. As a result, the width of each recording track can be reduced to thereby increase the number of tracks formed on the disk and increase the recording density.

Further, as the increase in the recording density is realized by slightly modifying a recording and reproducing device, a cost reduction can be expected.

Other objects and features of the invention will be more fully understood from the following detailed description and appended claims when taken with the accompanying drawings.

BRIEF DESCRIPTION OF THE DRAWINGS

FIG. 4 is an illustration of recording tracks to be formed by a multi-beam according to the present invention; and FIGS. 5A and 5B are illustrations of the principle of magneto-optical recording.

DETAILED DESCRIPTION OF THE PREFERRED EMBODIMENTS

Figure 1:
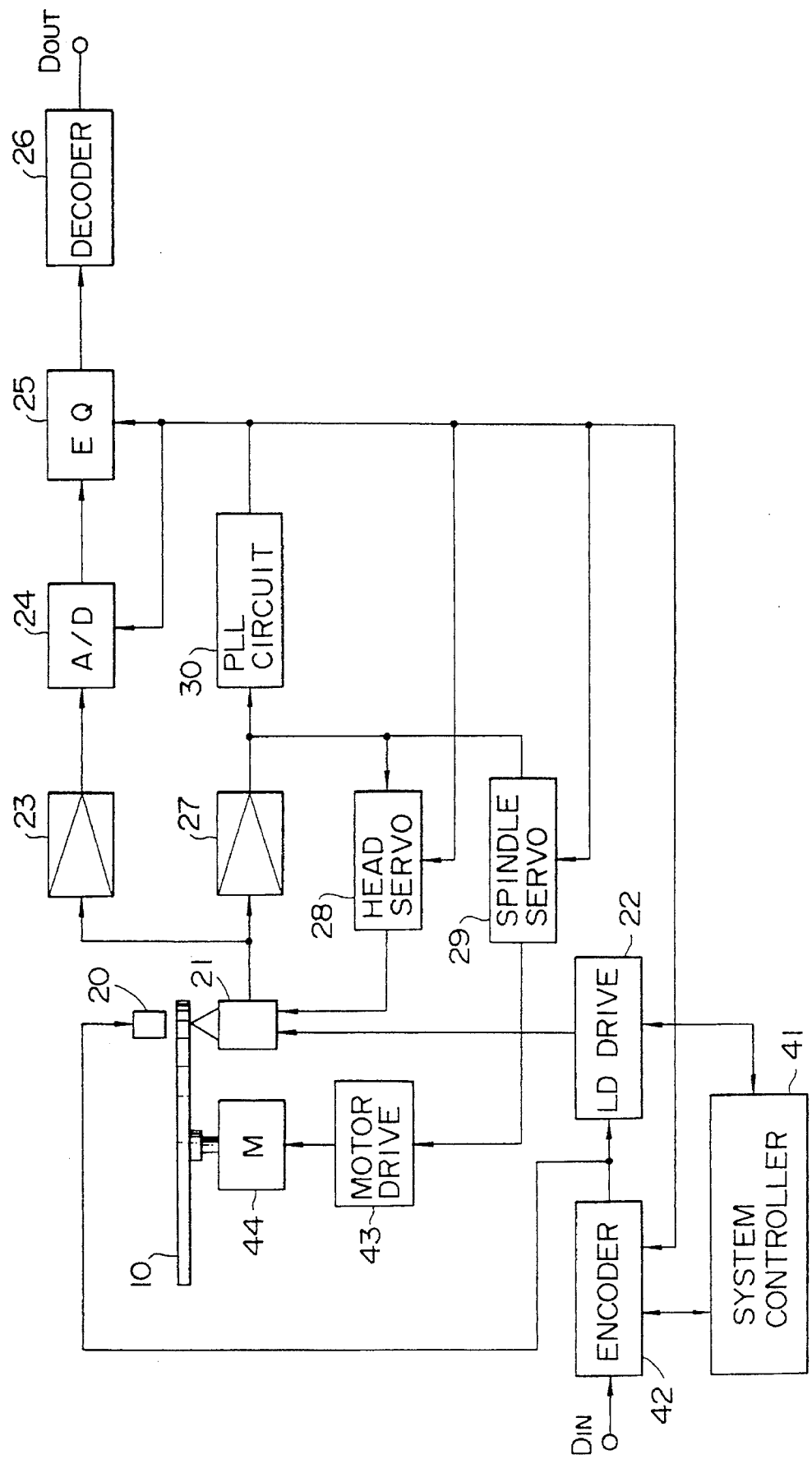
FIG. 1 is a block diagram of an optical disk device to which the magneto-optical recording and reproducing system of the present invention is applied.

Referring now to FIG. 1 which shows a construction of a magneto-optical recording and reproducing device to which the magneto-optical recording and reproducing system of the present invention is applied, a magneto-optical disk 10 is rotatably driven by a spindle motor 44 so that an angular velocity, for example, may become constant.

Reference numeral 20 denotes a magnetic head adapted to be modulated in magnetic field by a recording data, and reference numeral 21 denotes an optical head adapted to be moved together with the magnetic head 20 and irradiate a laser beam onto the magneto-optical disk 10.

In reproducing the magneto-optical disk 10, a detection signal is obtained from the optical head 21, and a signal indicative of a data area in the detection signal is supplied from a first pre-amplifier 23 to an A/D converter 24 in a reproduction signal processing system, thereafter being supplied to a digital equalizer 25. Then, the data processed in the digital equalizer 25 is supplied to a decoder 26, and the recorded information is output from the decoder 26.

As will be hereinafter described, a sample data previously recorded by embossing or the like in a sample servo area of the magneto-optical disk 10 is sampled by a second pre-amplifier 27 to form a tracking error signal and a rotation control signal.

The rotation control signal is supplied to a head servo circuit 28 and a spindle servo circuit 29.

A clock pit position signal detected in the sample servo area is supplied to a master clock forming circuit 30 such as a PLL circuit. An output signal from the master clock forming circuit 30 constitutes a reference signal as a master clock (external clock) in the device. For example, in recording the disk 10, recording data is encoded by the master clock in an encoder 42, and an output signal from the encoder 42 is supplied to the magnetic head 20 and an LD driving circuit 22.

Reference numeral 41 denotes a system controller for generally controlling the recording and reproducing device.

In such a magneto-optical recording and reproducing device as mentioned above, when a sample servo pit is formed on the magneto-optical disk, tracking information is detected from an RF signal obtained by reproducing the sample servo pit, and the optical head 21 and the magnetic head 20 are moved in a radial direction of the disk to record data on a spiral track.

When the track for recording the data is formed by a pre-groove, a tracking error signal is detected from an RF signal reflected by the pre-groove to carry out tracking servo such that a laser beam spot is positioned on the track formed by the pre-groove.

When recording data using a magnetic field modulation system, the data to be recorded on the track is supplied from a terminal $D_{IN}$ to the encoder 42, and a magnetizing current in the magnetic head 20 applies a magnetic field to the magneto-optical disk, which magnetic field is inverted by the recording data. At the same time, a laser beam output from the optical head 21 irradiates the track with pulses. Thus, the data is recorded along the track.

Figure 2:
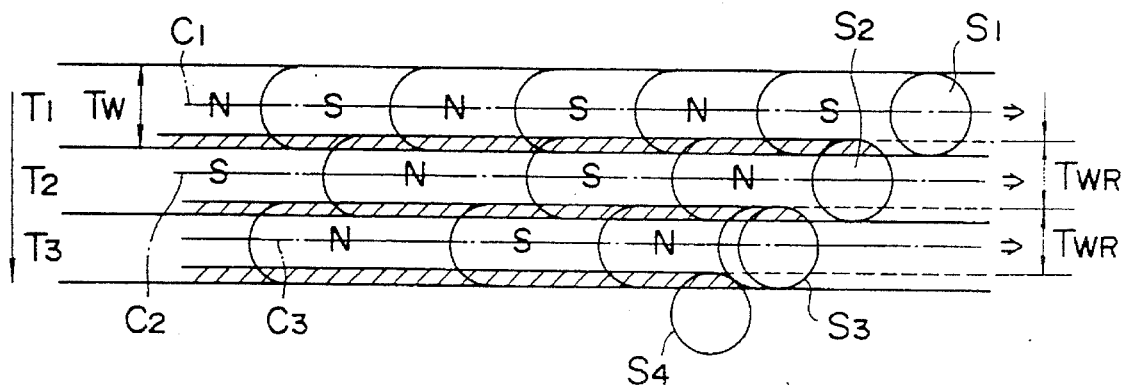
FIG. 2 is an illustration of overwrite recording according to the present invention.

FIG. 2 is an enlarged view of a recording track to illustrate the magneto-optical recording and reproducing system of the present invention. Referring to FIG. 2, $T_1$, $T_2$ and $T_3$ denote recording tracks each having a track width $T_w$ to be formed when laser beam spots $S_1$, $S_2$ and $S_3$ sequentially pass from the left to the right as viewed in FIG. 2. Further, $C_1$, $C_2$ and $C_3$ denote the centers of the tracks $T_1$, $T_2$ and $T_3$, respectively. The recording data is represented by N and S, and it is recorded in the edge pit state by high-density recording as previously mentioned.

According to the present invention, tracking control is carried out so that the track $T_1$, irradiated by the laser beam spot $S_1$, and the track $T_2$, irradiated by the laser beam spot $S_2$, overlap each other in the range shown by a hatched area. Accordingly, the data previously recorded by the laser beam spot $S_1$ in the hatched area is erased by the subsequent laser beam spot $S_2$ to carry out overwriting.

Similarly, the data previously recorded by the laser beam spot $S_2$ in another hatched area is erased by the subsequent laser beam spot $S_3$ to carry out overwriting.

Accordingly, a width of an actual recording track formed by each of the laser beam spots $S_1$, $S_2$ and $S_3$ becomes $T_{WR}$ which is smaller than a diameter of each of the laser beam spots $S_1$, $S_2$ and $S_3$. That is, a track pitch becomes smaller than the diameter of each laser beam spot.

As described above, in the magneto-optical recording and reproducing system of the present invention, overwrite recording is carried out so that a recording track width becomes smaller than a laser beam spot diameter. As a result, a quantity of data to be recorded in one disk can be increased.

The centers of the recording tracks formed by the laser beam spots $S_1$, $S_2$ and $S_3$ are offset from the centers of the tracks $T_1$, $T_2$ and $T_3$ which the laser beam spots $S_1$, $S_2$ and $S_3$ pass along.

Accordingly, tracking in reproduction should be corrected to be carried out along the overwrite recording track. It is preferable to carry out tracking control in reproduction so that an offset signal corresponding to the above-mentioned offset quantity in addition to a tracking error signal in recording is applied to the head servo circuit 28 to thereby offset a laser beam spot position to the recording track $T_1$, $T_2$ or $T_3$ and locate the center of the overwrite recording track at the position of the sample pit in reproduction.

Figure 3:
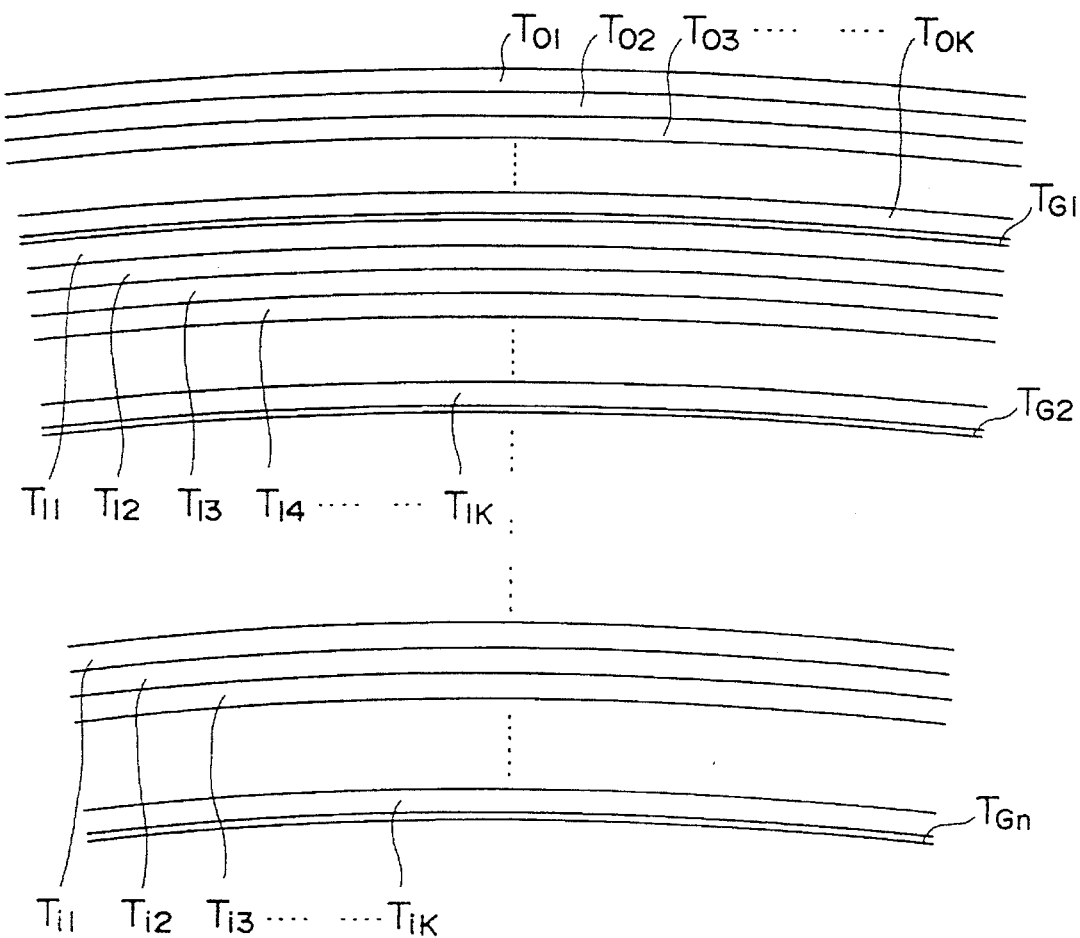
FIG. 3 is an illustration of recording tracks with guard bands provided according to the present invention.

FIG. 3 shows another preferred embodiment of the recording track on the magneto-optical disk formed by the above-mentioned method. In FIG. 3, $T_{OK}$–$T_{1K}$ denote overwrite recording tracks formed by the above-mentioned method, and $T_{G1}$–$T_{Gn}$ denote guard bands provided along every K tracks. The guard bands $T_{G1}$–$T_{Gn}$ may be formed on the disk by formatting the disk so as to provide a wide track along every K track, for example.

FIG. 4 shows a recording format in simultaneously forming overwrite recording tracks by means of three multi-beam laser spots $S_1$, $S_2$ and $S_3$.

In this case, the laser spots $S_1$, $S_2$ and $S_3$ are so located as to partially overlap each other, so that a width of each of three grooves constituting each of recording tracks $T_{M1}$, $T_{M2}$ and $T_{M3}$ becomes smaller than a diameter of each of the laser spots $S_1$, $S_2$ and $S_3$, thereby increasing a recording density.

Further, as data is written by the three beams, a circumferential length $l_{sc}$ of the track corresponding to one sector to be formed by a conventional one beam is reduced to ⅓, and accordingly three sectors can be formed in the length $l_{sc}$. As a result, not only the recording density but also a data transmitting speed can be improved.

As similar to the preferred embodiment shown in FIG. 3, a guard band $T_G$ may be provided between the adjacent ones of the tracks $T_M$ each formed by the three beams.

In the above preferred embodiments, each overwrite recording track is reproduced by superimposing an offset signal on a tracking error signal obtained from a sample pit or a pre-groove in recording to thereby offset the laser beam from the center of the track. In another way, overwrite recording may be carried out on a track to be virtually formed on the disk by the sample pit, and the laser spot in reading may be displaced by offset tracking to carry out reproduction at the center of the overwrite recording track.

In this case, the reproduction can be realized by applying a predetermined offset voltage to a tracking servo circuit in reading.

It is preferable to reduce the spot diameter of the laser beam by a reduced amount of the data recording track, so as not to reduce an S/N in reproduction.

In this case, another laser beam source for generating a read-only laser beam having a wavelength λ of 680 nm, for example, may be used to obtain a laser spot diameter smaller than that for recording. Thus, it is recommended that recording and reproduction are to be carried out by two-beam system employing two light sources for recording and reproduction.

Such a two-beam system can be easily realized because a low-power laser source may be utilized as the laser light source for reproduction.

In another preferred embodiment, the laser spot for reproduction may be constituted of three spots $S_1$, $S_2$ and The central laser spot $S_2$ may be tracked to the center of the overwrite recording track, and reproduced RF signals obtained from the laser spots $S_1$ and $S_3$ on the opposite sides of the laser spot $S_2$ may be subtracted from a reproduced RF signal obtained from the laser spot $S_2$ to thereby cancel cross-talk from the adjacent tracks and improve the S/N in reproduction.

Although the magneto-optical disk is recorded by a magnetic field modulation system in the above preferred embodiments, the present invention may be applied to any other recording and reproducing systems for magneto-optical disks such that a laser beam and a magnetic field are applied to two recording layers to carry out overwrite recording by an optical modulation system or utilize a phase change to carry out data recording and reproduction.

While the invention has been described with reference to specific embodiments, the description is illustrative and is not to be construed as limiting the scope of the invention. Various modifications and changes may occur to those skilled in the art without departing from the spirit and scope of the invention as defined by the appended claims.

What is claimed is:

1. A magneto-optical recording and reproducing system for recording data onto a magneto-optical disk having a recording layer and for reproducing the recorded data, comprising:

motor drive means for rotating the magneto-optical disk about its axis;

first means for irradiating the magneto-optical disk with at least one pulsed laser beam to bring to at least a Curie temperature the recording layer to form adjacent partially overlapping recording tracks on the magneto-optical disk, the adjacent partially overlapping recording tracks bounded by a pair of unrecorded magneto-optical guard tracks;

magnetic field means for successively applying to each adjacent partially overlapping recording track a magnetic field to switch the normal component of magnetic domain orientations within each track;

means for modulating the magnetic field means in accordance with input data to be recorded;

second means for detecting magnetic domain orientations within each recorded track and generating a detection signal in response to the changes in magnetic domain orientations, the second means irradiating each recorded track with at least one laser beam having a wavelength less than that of the pulsed laser beam; and signal processing means for converting the detection signal into data representative of the input data.

2. A magneto-optical recording and reproducing system for recording data onto a magneto-optical disk having a recording layer and for reproducing the recorded data, comprising:

motor drive means for rotating the magneto-optical disk about its axis;

first means for irradiating the magneto-optical disk with at least one pulsed laser beam to bring to at least a Curie temperature the recording layer to form adjacent partially overlapping recording tracks on the magneto-optical disk, the adjacent partially overlapping recording tracks bounded by a pair of unrecorded magneto-optical guard tracks;

magnetic field means for successively applying to each adjacent partially overlapping recording track a magnetic field to switch the normal component of magnetic domain orientations within each track;

means for modulating the magnetic field means in accordance with input data to be recorded;

second means for detecting magnetic domain orientations within each recorded track and generating a detection signal in response to the changes in magnetic domain orientations, the second means irradiating each recorded track with at least one laser beam having a wavelength less than that of the pulsed laser beam; and signal processing means for converting the detection signal into data representative of the input data;

wherein the second means further comprises:

means for generating first and second outer laser spots and a central laser spot on the magneto-optical disk;

means for generating a first RF signal from the reflection of a first outer laser spot;

means for generating a second RF signal from the reflection of a central laser spot;

means for generating a third RF signal from the reflection of a second outer laser spot; and means for subtracting from the second RF signal the sum of the first and third RF signals to generate the detection signal.

3. The magneto-optical recording and reproducing system of claim 2 wherein the wavelength of the irradiation of the laser beam of the second means is substantially equal to 650 nanometers.

4. The magneto-optical recording and reproducing system of claim 2 wherein the first means further comprises:

means for offsetting the center of each pulsed laser beam.

5. The magneto-optical recording and reproducing system of claim 2, wherein the first means comprises a laser for simultaneously irradiating the magneto-optical disk with a plurality of pulsed laser beams to form the adjacent partially overlapping recording tracks.

6. The magneto-optical recording and reproducing system of claim 5, wherein the laser simultaneously irradiates the magneto-optical disk with three laser beams.

7. The magneto-optical recording and reproducing system of claim 2, wherein the first means comprises a first light source and the second means comprises a second light source.

8. The magneto-optical recording and reproducing system of claim 2, further comprising:

tracking error means for detecting and outputting a tracking error signal obtained from a sample pit or a pregroove on the magneto-optical disc; and tracking means for performing tracking control of the second means by superimposing a predetermined offset signal on the tracking error signal, so second means tracks the recording track at a position offset from the overwrite recording track center.

9. The magneto-optical recording and reproducing system of claim 1, wherein the first means comprises a laser for simultaneously irradiating the magneto-optical disk with a plurality of pulsed laser beams to form the adjacent partially overlapping recording tracks.

10. The magneto-optical recording and reproducing system of claim 9, wherein the laser simultaneously irradiates the magneto-optical disk with three laser beams.

11. The magneto-optical recording and reproducing system of claim 1, wherein the first means comprises a first light source and the second means comprises a second light source.

12. A magneto-optical recording and reproducing system for recording data onto a magneto-optical disk having a recording layer and for reproducing the recorded data, comprising:

motor drive means for rotating the magneto-optical disk about its axis;

first means for irradiating the magneto-optical disk with at least one pulsed laser beam to bring to at least a Curie temperature the recording layer to form adjacent partially overlapping recording tracks on the magneto-optical disk, the adjacent partially overlapping recording tracks bounded by a pair of unrecorded magneto-optical guard tracks, with a center of the pulsed laser beam which forms each recording track defining an overwrite recording track center for each recording track;

magnetic field means for successively applying to each adjacent partially overlapping recording track a magnetic field to switch the normal component of magnetic domain orientations within each track;

means for modulating the magnetic field means in accordance with input data to be recorded;

second means for detecting magnetic domain orientations within each recorded track and generating a detection signal in response to the changes in magnetic domain orientations, the second means irradiating each recorded track with at least one laser beam having a wavelength less than that of the pulsed laser beam;

signal processing means for converting the detection signal into data representative of the input data;

tracking error means for detecting and outputting a tracking error signal obtained from a sample pit or a pregroove on the magneto-optical disc; and tracking means for performing tracking control of the second means by superimposing a predetermined offset signal on the tracking error signal, so second means tracks the recording track at a position offset from the overwrite recording track center.

\* \* \* \* \*